J. H. ANDERSON.
HARROW.
APPLICATION FILED JAN. 20, 1910.
998,826.
Patented July 25, 1911.
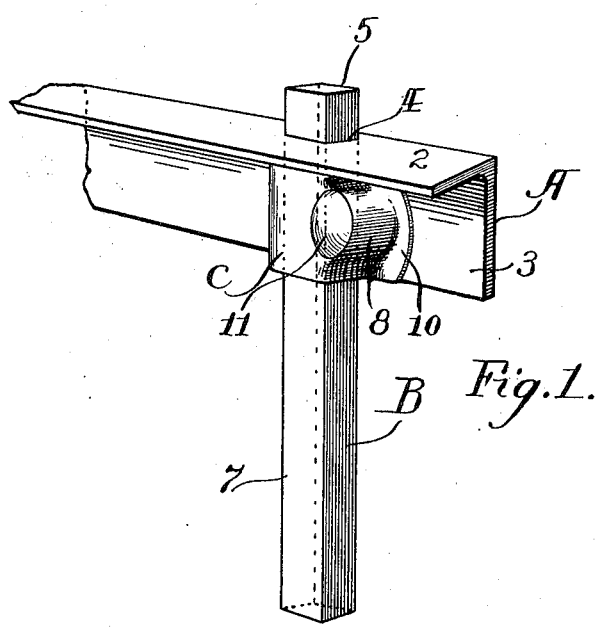
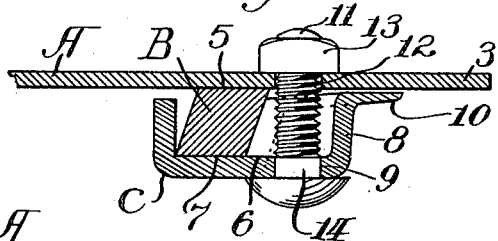
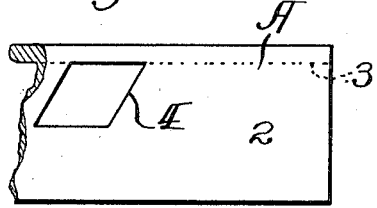
Witnesses:
Jule Donovan
H. L. Fischer
Inventor:
John H. Anderson,
by: D. Bradbury
Attorney.
COLUMBIA PLANOGRAPH CO., WASHINGTON, D. C.

UNITED STATES PATENT OFFICE.

JOHN H. ANDERSON, OF ST. PAUL, MINNESOTA.

HARROW.

998,826. Specification of Letters Patent. Patented July 25, 1911.

Application filed January 20, 1910. Serial No. 538,973.

*To all whom it may concern:*

Be it known that I, JOHN H. ANDERSON, a citizen of the United States, residing at St. Paul, in the county of Ramsey and State of Minnesota, have invented a new and useful Improvement in Harrows, of which the following is a specification.

My invention relates to improvements in harrows and more particularly has to do with an improved harrow tooth and means for connecting a harrow tooth to a harrow bar.

The primary object of my invention is to provide simple and inexpensive construction which is more efficient and effective in operation than heretofore.

A further object is to provide a fastening for a harrow tooth which is not liable to get out of order and which will securely hold the tooth upon its bar support without danger of becoming loosened or detached under the most exacting service.

My invention consists in the features of construction and arrangement and combination of elements hereinafter set forth, pointed out in the claims and illustrated by the accompanying drawing.

Figure 1 is a perspective view of a detail of a harrow bar illustrating my invention applied thereto; Fig. 2 is a longitudinal section of Fig. 1 taken through the center of the yoke clamp, and Fig. 3 is a plan of a detail of the harrow bar.

In the construction of my invention as shown A represents a detail of a harrow bar, a plurality of said bars being adapted to be assembled in a frame in the usual manner as desired.

B represents my improved harrow tooth and C a yoke clamp by which the harrow tooth is secured to said harrow bar. The harrow bar is preferably of angle iron construction having a top flange 2 and a side flange 3. In the top flange is a perforation 4 in shape corresponding with the outline of a cross section of the harrow tooth B said perforation being adapted to admit the upper end of the harrow tooth when in substantially vertical position.

The harrow tooth is blunt on both ends and angular in cross section, it being as illustrated in the drawing of diamond shape in cross section at any place between its ends. The tooth is held with its inner side 5 flat against the side 3 of the angle iron bar immediately below its top 2. In this position the tooth is held by means of the yoke clamp C which consists of a forged, stamped or cast yoke having an elongated channel 6 impinging against the outer side 7 of the harrow tooth. At one side of the yoke a lug 8 is formed which is perforated at 9 and shaped with a longitudinal flange 10 bearing against the side 3, of the bar A. A bolt 11 passes through the perforation 9 and a hole 12 in the side 3 of the bar and is secured home by a nut 13 threaded upon its shank and with the bolt holding the yoke clamp securely with the harrow tooth rigidly upon the harrow bar. The perforation 9 is square for the admission of a square portion 14 on the shank of the bolt to assist in holding the yoke clamp more securely upon the harrow bar. The upper end of the yoke clamp fits snugly below the top 2 of the harrow bar, and said yoke clamp and harrow tooth are thus prevented from oscillating in a vertical plane. The sides of the harrow tooth are held diagonally upon the harrow bar. Thus the tooth can be reversed end for end or its side position changed thus presenting a fresh cutting edge whenever desired. This construction is obviously an advantage because it is less expensive and prolongs the life of the tooth.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In an agricultural implement, a harrow bar of angle iron construction having through its top wall a perforation, a reversible harrow tooth of diamond shape in cross section, blunt on both ends and passing upwardly through said perforation with one of its sides lying flat against the side of said angle iron to hold its opposite erect edges oblique to said bar, a yoke clamp impinging upon another side of said tooth and engaging thereover, and a fastening bolt passing through the side of said angle iron and through said clamp at one side of said tooth.

2. In an agricultural implement, a reversible harrow tooth blunt on both ends and of diamond shape in cross section at any part near its ends.

3. In an agricultural implement, a reversible harrow tooth blunt on both ends and of angular shape in cross section at any part near its ends.

In testimony whereof, I have signed my name to this specification, in the presence of two subscribing witnesses.

JOHN H. ANDERSON.

Witnesses:
ARTHUR B. ANDERSON,
H. L. FISCHER.

Copies of this patent may be obtained for five cents each, by addressing the "Commissioner of Patents, Washington, D. C."